United States Patent [19]
Kodama

[11] Patent Number: 5,131,295
[45] Date of Patent: Jul. 21, 1992

[54] CONTROL OF GEAR SHIFTING IN AUTOMATIC TRANSMISSION

[75] Inventor: Mikio Kodama, Shizuoka, Japan

[73] Assignee: Jatco Corporation, Japan

[21] Appl. No.: 703,788

[22] Filed: May 21, 1991

[30] Foreign Application Priority Data

May 22, 1990 [JP] Japan .................. 2-131944

[51] Int. Cl.$^5$ .............................................. F16H 59/16
[52] U.S. Cl. ......................................... 74/862; 74/866
[58] Field of Search ............................ 74/862, 866

[56] References Cited

U.S. PATENT DOCUMENTS

| | | | |
|---|---|---|---|
| 3,942,393 | 3/1976 | Forster et al. | 74/862 X |
| 4,008,567 | 2/1977 | Hirsch | 74/866 X |
| 4,224,842 | 9/1980 | Rabus et al. | 74/866 |
| 4,259,882 | 4/1981 | Miller | 74/862 |
| 4,312,249 | 1/1982 | Hau et al. | 74/866 |
| 4,485,443 | 11/1984 | Knodler et al. | 74/866 X |
| 4,730,521 | 3/1988 | Hayasaki et al. | 74/867 |
| 4,742,461 | 5/1988 | Eschrich et al. | 364/424.1 |
| 4,807,496 | 2/1989 | Hayasaki et al. | 74/866 |
| 4,841,815 | 6/1989 | Takahashi | 74/866 |
| 4,845,618 | 7/1989 | Narita | 74/866 X |
| 4,922,424 | 5/1990 | Hiramatsu | 74/866 X |
| 4,947,330 | 8/1990 | Hiramatsu | 74/866 X |

FOREIGN PATENT DOCUMENTS 62-93555 4/1987 Japan .
62-194940 8/1987 Japan .

OTHER PUBLICATIONS

Service Manual (publication No. A261C07) entitled "Nissan Full Range Electronically Controlled Automatic Transmission RE4R01A Type", published by Nissan Motor Company Limited in Mar. 1987.

Primary Examiner—Dirk Wright
Attorney, Agent, or Firm—Ronald P. Kananen

[57] ABSTRACT

In an automatic transmission of a motor vehicle, a torque of a transmission output member is detected, after the detected torque has dropped at a rate greater than a predetermined value after generation of a gear shifting command signal, a length of time elapsed thereafter is measured, a pressurized hydraulic fluid is modified as a predetermined function of the length of time measured, and a hydraulically actuable coupling is actuated by the modified pressurized hydraulic fluid.

6 Claims, 7 Drawing Sheets

FIG. 2

| | C18 | C20 | C22 | C24 | B28 | B26 | OWC 30 | OWC 29 | | $\alpha_1 = 0.440$<br>$\alpha_2 = 0.493$ |
|---|---|---|---|---|---|---|---|---|---|---|
| | | | ○ | | | | ○ | ○ | $\dfrac{1+\alpha_2}{\alpha_2}$ | 3.027 |
| | | | ○ | | ○ | | ○ | | $\dfrac{\alpha_1+\alpha_2+\alpha_1\alpha_2}{\alpha_2(1+\alpha_1)}$ | 1.619 |
| | | ○ | ○ | | | | ○ | | 1 | 1.000 |
| | | | (○) | ○ | ○ | | (○) | (○) | $\dfrac{1}{1+\alpha_1}$ | 0.694 |
| | | | (○) | ○ | | ○ | | | | |
| | | ○ | (○) | | ○ | | (○) | | | |
| | | ○ | (○) | ○ | | | (○) | | | |
| | ○ | | | | | ○ | | | $-\dfrac{1}{\alpha_1}$ | −2.272 |

CONTROL OF GEAR SHIFTING IN AUTOMATIC TRANSMISSION

BACKGROUND OF THE INVENTION

The present invention relates to a method of and a system for controlling an automatic transmission of a motor vehicle, and more particularly to a method of and a system for a gear shifting control by a hydraulically actuable coupling by a pressurized hydraulic fluid.

It is known in the prior art to control the pressure of the hydraulic fluid that serves to actuate the hydraulically actuable and frictionally engageable couplings of the automatic transmission in a manner dependent on various operating parameters of the motor vehicle in which the transmission is installed.

Various proposals have been made in improving riding comfort during a gear shifting. Japanese patent application first (unexamined) publications 62-93555 and 62-194940 disclose a gear shifting control wherein a stroke of a servo piston of a hydraulically actuable coupling to be engaged related to a new gear is detected and the pressure of the hydraulic fluid acting in the servo is controlled in accordance with the detected stroke position of the piston in order to alleviate the shift shock. This gear shifting control requires a position sensor for each of the couplings and thus poses a problem of finding a space for accommodating such position sensors.

U.S. Pat. No. 4,742,461 (Eschrich et al.) discloses another approach to improve riding comfort during gear shiftings. According to this known method, correction values for the pressure of the hydraulic fluid of the gear shifting control are determined by a comparison of reference values with average actual values and stored correction values. In the subsequent driving, the stored correction values are used to control the pressure of the hydraulic fluid medium to maintain a standard of comfort for all shift operations and new average actual values are used from time to time to modify the correction values.

An object of the present invention is to provide a gear shifting control which is improved such that after generation of a gear shifting command, an appropriate optimum timing at which the pressure for the hydraulic fluid begins to be controlled is accurately and reliably detected without relying on bulky position sensors.

SUMMARY OF THE INVENTION

According to one aspect of the present invention, there is provided a method of controlling an automatic transmission of a motor vehicle, wherein the automatic transmission has an output member, and effects a gear shifting by a hydraulically actuatable coupling by a pressurized hydraulic fluid, the method comprising the steps of:

detecting a torque of the output member and generating an output torque indicative signal indicative of said torque detected;

measuring a length of time elapsed after a rate of change of said output torque indicative signal has met a predetermined relationship with a predetermined value after generation of a gear shifting command signal and generating a time indicative signal indicative of said length of time elapsed;

modifying the pressurized hydraulic fluid as a predetermined function of said time indicative signal; and actuating the hydraulically actuable coupling by said modified pressurized hydraulic fluid.

According to another aspect of the present invention, there is provided a system for controlling an automatic transmission of a motor vehicle, wherein the automatic transmission has an output member, and effects a gear shifting by a hydraulically actuatable coupling by a pressurized hydraulic fluid, the system comprising:

a torque sensor means for detecting a torque of the output member and generating an output torque indicative signal indicative of said torque detected;

a control unit including, means for measuring a length of time elapsed after a rate of change of said output torque indicative signal has met a predetermined relationship with a predetermined value after generation of a gear shifting command signal and generating a time indicative signal indicative of said length of time elapsed, and means for generating a correction signal as a predetermined function of said time indicative signal;

means for modifying the pressurized hydraulic fluid in response to said correction signal; and means for actuating the hydraulically actuable coupling by said modified pressurized hydraulic fluid.

BRIEF DESCRIPTION OF THE DRAWINGS

FIG. 2 is a table illustrating which one or one of the frictionally engageable couplings are actuated in each of the speeds;

DETAILED DESCRIPTION OF THE INVENTION

Figure 1:
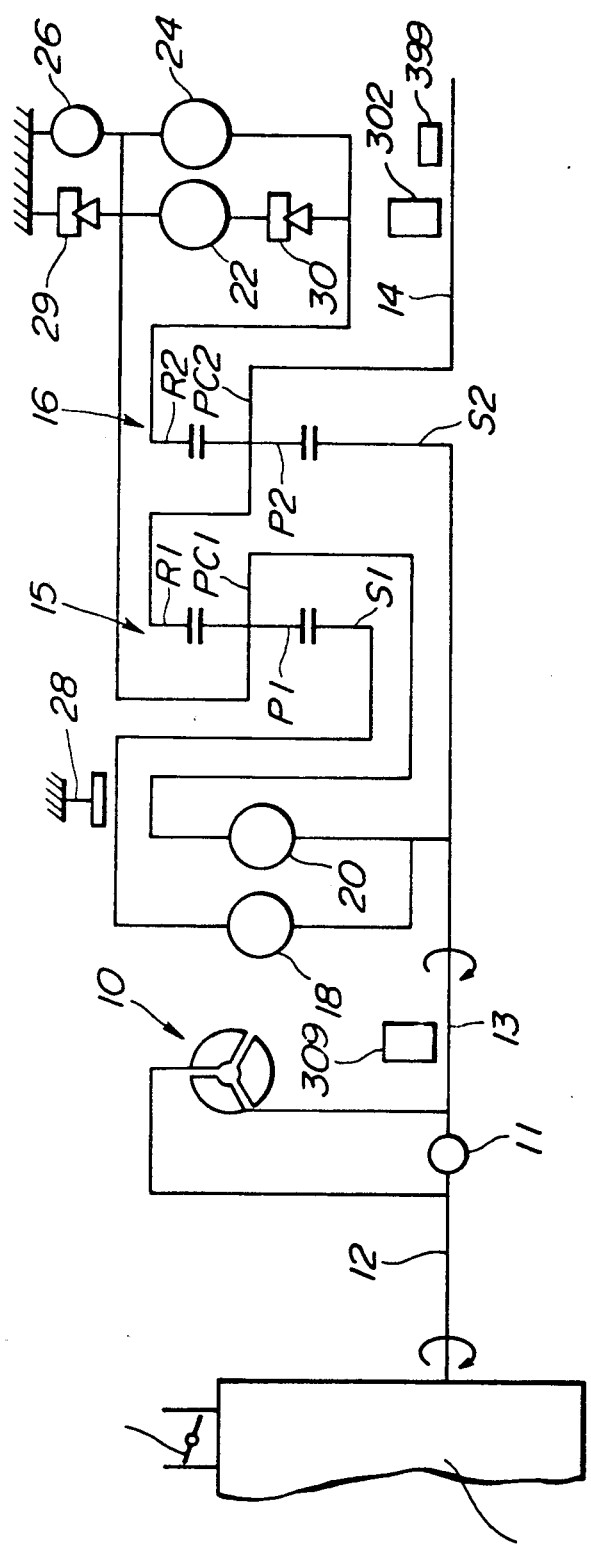
FIG. 1 is a schematic diagram of an automatic stepwise operable transmission coupled with an engine of a motor vehicle.

Referring to FIG. 1, an automatic stepwise operable transmission is drivingly coupled with a torque converter 10 which is in turn drivingly coupled with an output shaft 12 of an engine of a motor vehicle. The engine has a throttle which opens in degrees. The automatic transmission provides four forward speeds with an overdrive and a single reverse. The transmission includes an input shaft 13 connected to a turbine runner of the torque converter 10, and an output shaft 14 connected to a final drive gear assembly, not illustrated. It also includes a first planetary gear set 15, a second planetary gear set 16, a reverse clutch 18, a high clutch 20, a forward clutch 22, an overrunning clutch 24, a low and reverse brake 26, a band brake 28, a low one-way clutch 29, and a forward one-way clutch 30. The torque converter 10 includes therein a lock-up clutch 11. The first planetary gear set 15 comprises a sun gear S1, a ring gear R1, and a pinion carrier PC1 rotatably supporting pinion gears P1 each meshing both the sun and ring gears S1 and R1. The planetary gear set 16 comprises a sun gear S2, a ring gear R2, and a pinion carrier PC2 rotatably supporting pinion gears P2, each meshing both the sun and ring gears S2 and R2. The carrier PC1 is connectable to the input shaft 13 via the high clutch 20, while the sun gear S1 is connectable to the input shaft 13 via the reverse clutch 18. The carrier PC1 is connectable to the ring gear R2 via the forward clutch 22 and the forward one-way clutch 30 arranged in series with the forward clutch 22 or via the overrunning clutch 24 arranged in parallel to both the forward clutch 22 and forward one-way clutch 30. The sun gear S2 is connected to the input shaft 13, while the ring gear R1 and the carrier PC2 are constantly connected to the output shaft 14. The low and reverse brake 26 is arranged to hold the carrier PC1 stationary, while the band brake 28 is arranged to hold the sun gear S1 stationary. The low one-way clutch 29 is arranged to allow a rotation in a forward direction (the same direction as a direction in which the engine shaft 12 rotates), but preventing a rotation in the opposite reverse direction.

In this transmission, the rotating states of various rotary elements (S1, S2, R1, R2, PC1, and PC2) of the planetary gear sets 15 and 16 are varied by actuating the hydralically actuable and frictionally engageable couplings, namely, the clutches 18, 20, 22, 24, and brakes 26. 28, in different kinds of combination, thereby to vary a revolution speed of the output shaft 14 relative to a revolution speed of the input shaft 13. Four forward speeds and a reverse speed are provided by actuating the clutches 18, 20, 22, and 24, and the brakes 26 and 28 in various combinations as shown in FIG. 2. In FIG. 2, the sign ◯ (circle) denotes that a particular coupling to which it is assigned is actuated or engaged, the signs $\alpha 1$ (alpha one) and $\alpha 2$ (alpha two) designate a ratio of number of teeth of the ring gear R1 to that of the sun gear S1 and a ratio of number of teeth of the ring gear R2 to that of the sun gear S2, and a gear ratio is a ratio of a revolution speed of the input shaft 13 to that of the output shaft 14.

Figure 3:
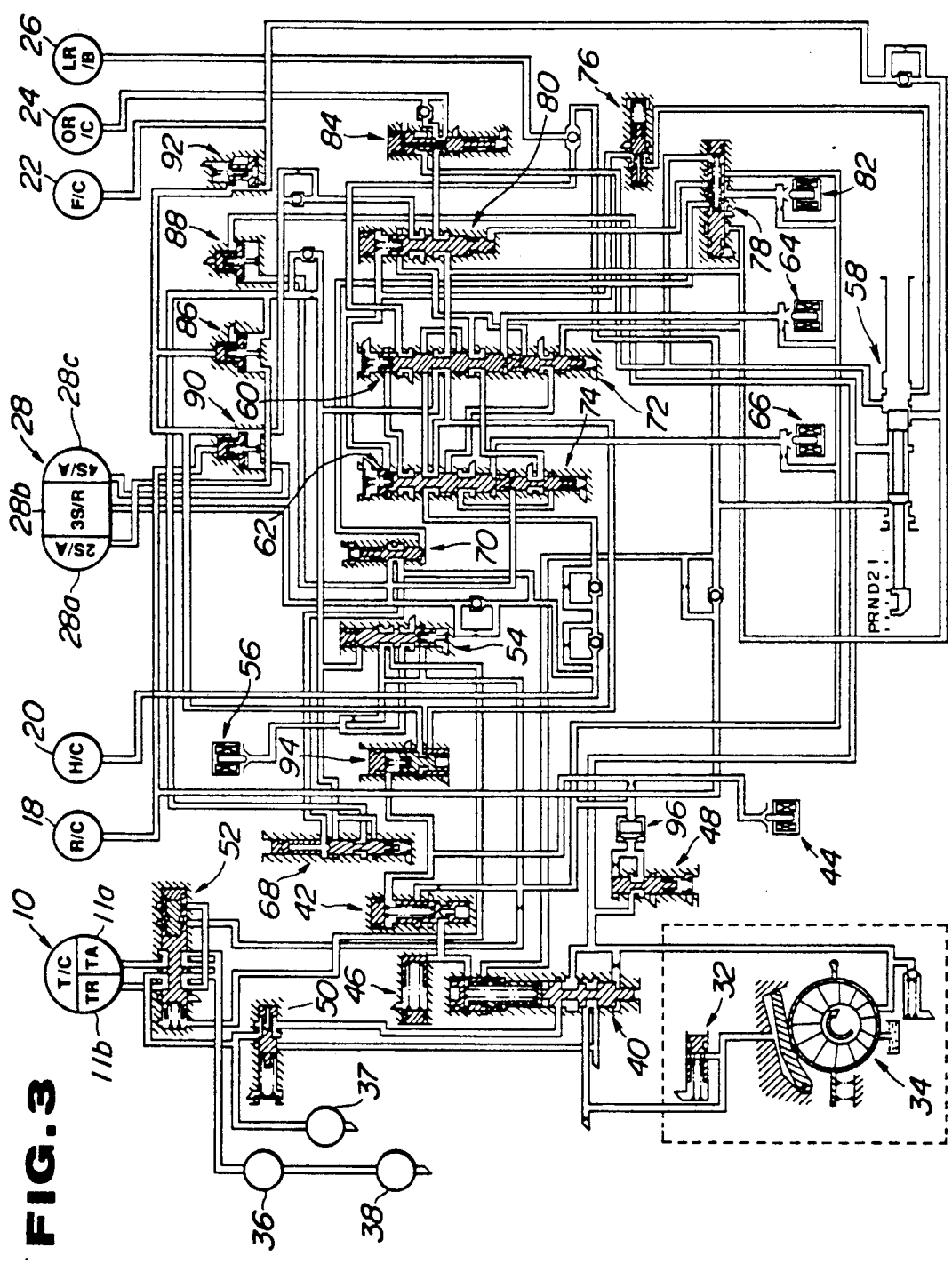
FIG. 3 is a circuit diagram of a hydraulic control system of the automatic transmission.

FIG. 3 shows a hydraulic control system of the transmission. This hydraulic control system comprises a pressure regulator valve 40, a pressure modifier valve 42, a line pressure solenoid 44, a modifier pressure accumulator 46, a pilot valve 48, a torque converter relief valve 50, a lock-up control valve 52, a first shuttle valve 54, a lock-up solenoid 56, a manual valve 58, a first shift valve 60, a second shift valve 62, a first shift solenoid 64, a second shift solenoid 66, a servo charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid 82, an overrunning clutch reducing valve 84, a 1-2 accumulator 86, a 2-3 accumulator 88, a 3-4 accumulator 90, a N-D accumulator 92, an accumulator control valve 94, and a filter 96. These components are interconnected as illustrated. As illustrated, they are connected also to the before-mentioned torque converter (the torque converter 10 includes an apply chamber 11$a$ and a release chamber 11$b$ for the lock-up clutch 11), the forward clutch 22, the high clutch 20, the band brake 28 (the band brake 28 including a second speed apply chamber 28$a$, a third speed release chamber 28$b$, and a fourth speed apply chamber 28$c$), the reverse clutch 18, the low and reverse brake 26, and the overrunning clutch 24. They are connected also to the variable capacity vane type oil pump 34, the oil cooler 36, the forward lubrication circuit 37, and the rear lubrication circuit 38 as illustrated. The detailed description of these valves is hereby omitted. The automatic transmission thus far briefly described is substantially the same as an automatic transmission of RE4R-01A type which is manufactured by Nissan Motor Company Limited in Japan. The automatic transmission of the RE4R01A type is described in a service manual (publication No. A261C07) entitled "NISSAN FULL RANGE ELECTRONICALLY CONTROLLED AUTOMATIC TRANSMISSION RE4R01A TYPE" published by Nissan Motor Company Limited in March, 1987. U.S. Pat. No. 4,730,521 issued to Hayasaki et al. on Mar. 15, 1989 discloses the automatic transmission of the RE4R01A type. Thus reference is made to the above-mentioned service manual and the U.S. Pat. No. 4,730,521 for a full understanding of the automatic transmission of this type. In this automatic transmission, the magnitude of a line or system pressure is controllable by the line pressure solenoid 44. The manner of controlling the magnitude of the line pressure is described on pages I-22 to I-24 of the above-mentioned service manual. Reference is made to claims 1 to 7 of U.S. Pat. No. 4,807,496 issued to Hayasaki et al on Feb. 28, 1989 for understanding features of the line pressure control.

Figure 4:
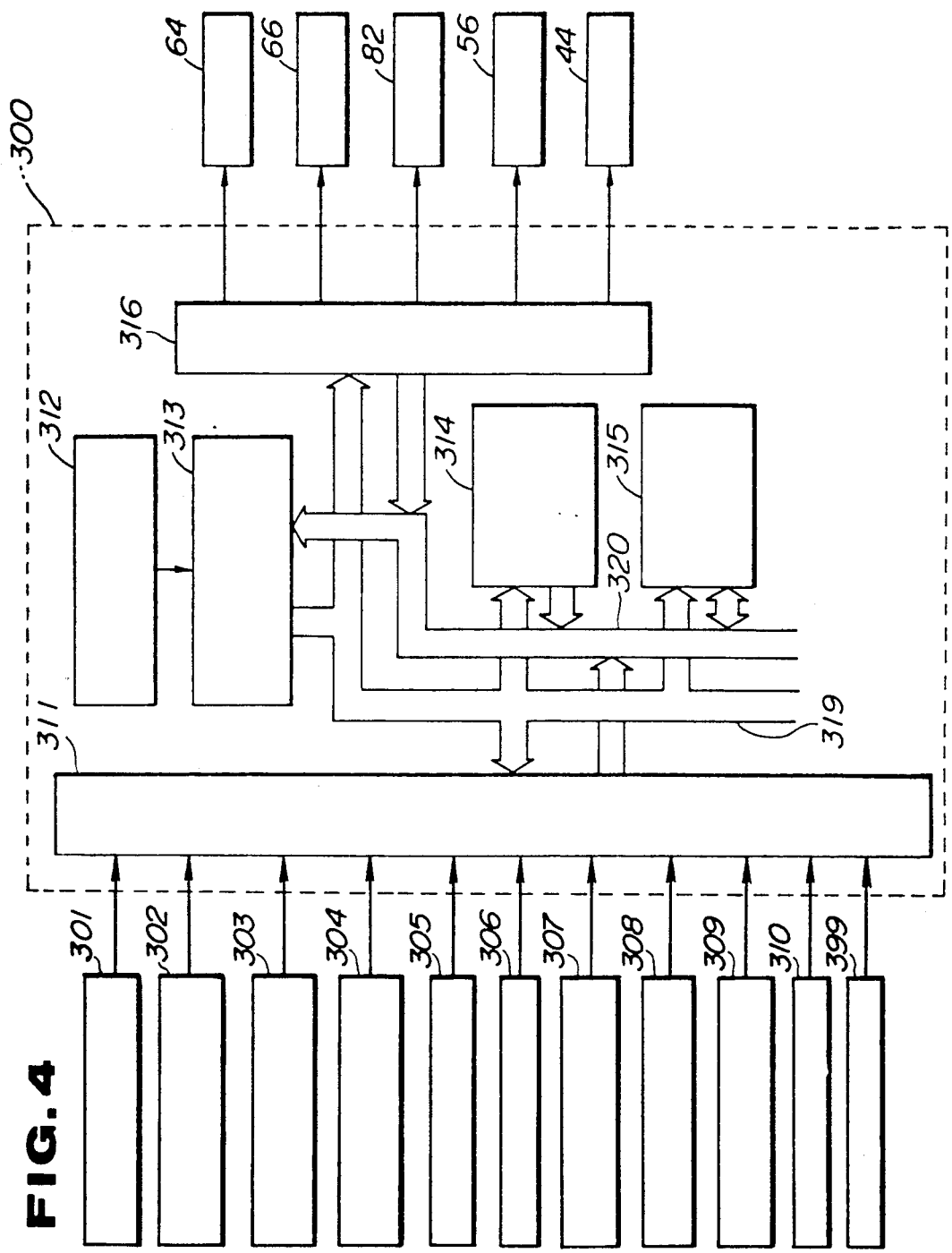
FIG. 4 is a block diagram of an automatic transmission control unit.

FIG. 4 shows an automatic transmission control unit 300 which controls the solenoids 44, 56, 64, 66 and 82. The control unit 300 comprises an input interface 311, a reference pulse generator 312, a CPU (a central processor unit) 313, a ROM (a read only memory) 314, a RAM (a random access memory) 315, and an output interface 316. They are interconnected by an address bus 319, and a data bus 320. Fed to this control unit 300 are signals of an engine revolution speed sensor 301, an output shaft revolution speed sensor (a vehicle speed sensor) 302, a throttle opening degree sensor 303, a select position switch 304, a kickdown switch 305, an idle switch 306, a full throttle switch 307, an oil temperature sensor 308, an input shaft revolution speed sensor (a turbine revolution speed sensor) 309, an overdrive switch 310, and a torque sensor 399. The output shaft revolution speed sensor 302 detects a revolution speed of the output shaft 14. The input shaft revolution speed sensor 309 detects a revolution speed of the input shaft 13. The torque sensor 399 detects a torque of the output shaft 14. The outputs of the control unit 300 are supplied to the shift solenoids 64 and 66, overrunning clutch solenoid 82, lock-up solenoid 56, and line pressure solenoid 44.

The shift valves 60 and 62 which are actuable by the corresponding shift solenoids 64 and 66, and the pressure regulator valve 40 and pressure modifier valve 42 which are actuable by the line pressure solenoid 44 are controlled by the automatic transmission control unit 300.

Reference is made to pages I-22 to I-27 of the service manual (publication No. A261C07) and to the U.S. Pat. No. 4,730,521 for explanation of actuation of the solenoids 44, 64 and 66, and valves 42, 60 and 62. The necessary control functions are performed in the control unit 300.

A 2-3 upshift in the D range is explained for the purpose of assisting understanding of the actuation of the shift solenoid 66 and shift valve 62. The 2-3 upshift is initiated by deenergizing the shift solenoid 66 with the shift solenoid 64 held energized. When it is deenergized, the shift solenoid 66 opens a drain circuit to discharge a pilot pressure from the shift solenoid 62. This causes a pressurized hydraulic fluid under a line pressure to be supplied to the 2-3 accumulator 88, the high clutch (H/C) 20, and a servo release chamber 28$b$ of the band brake 28. The line pressure is directly supplied to the 2-3 accumulator 88 and acts as a back-up pressure. The manner of increase of the pressure of the hydraulic fluid supplied to the high clutch 20 is controlled by varying the magnitude of the line pressure.

The manner of the gear shifting control according to the present invention is explained below in principle with reference to the signal diagram shown in FIG. 8.

Figure 8:
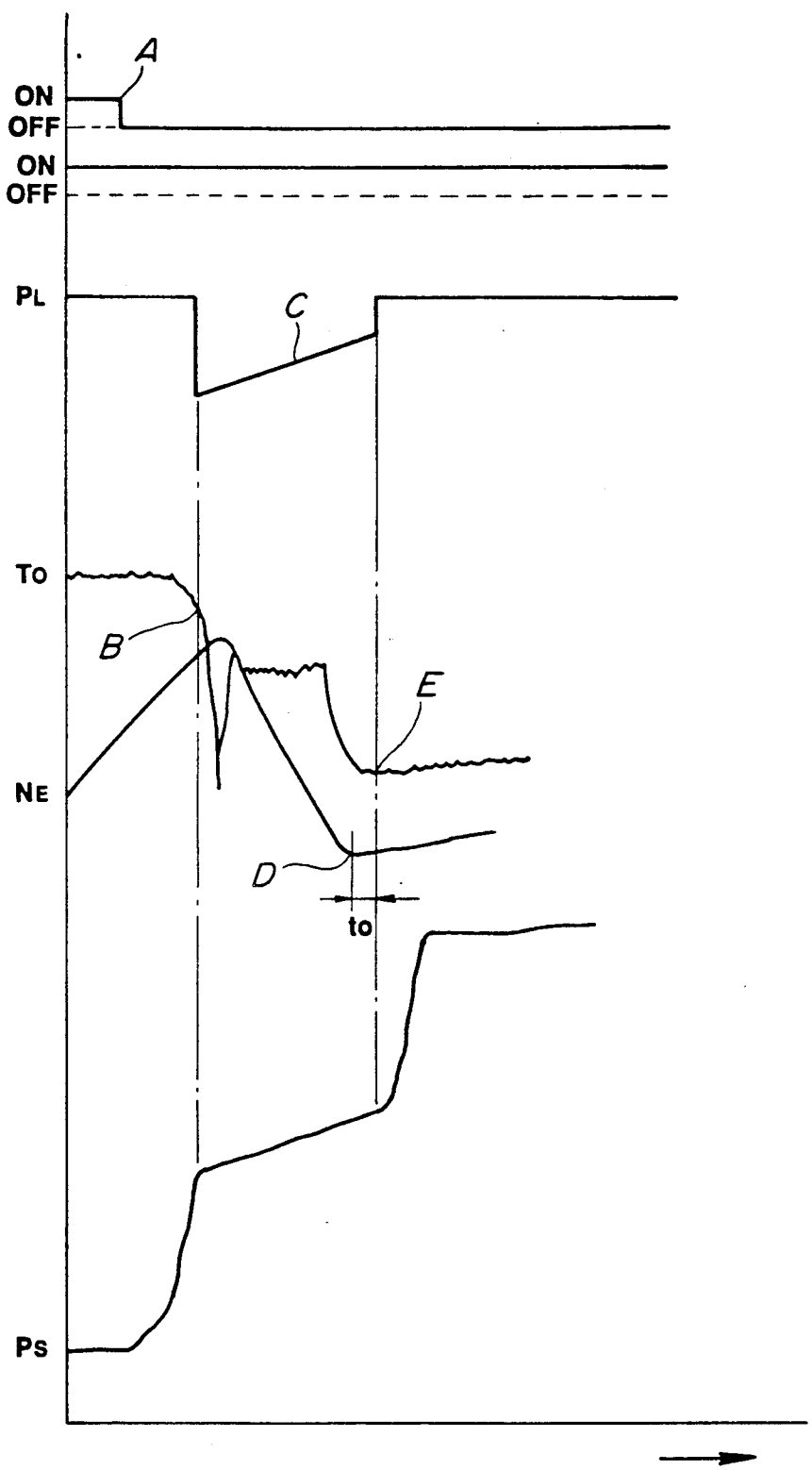
FIG. 8 is a signal and pressure diagram for explaning the manner of operation.

At the top of FIG. 8 is shown a 2-3 gear shift command signal A in the form of a downstep. After the signal A appears, a pressurized hydraulic fluid $P_S$ supplied to the coupling, namely the high clutch 20, related to the new gear, namely the third speed, increases, causing the servo piston of the high clutch 20 to stroke and release the coupling, namely the band brake 28, related to the previous gear, namely, the second speed. The output shaft torque $T_O$ stays substantially unchanged immediately after the gearing shifting signal A has appeared. At a moment B when the output torque $T_O$ drops to such a degree that a rate of change of the output torque $T_O$, namely a time derivative ($dT_O$.dt), becomes less than a predetermined value ($T_D$), the line pressure $P_L$ is decreased by a predetermined magnitude ($-D$). A timer TM is initiated at the moment B to measure a length of time elapsed after the moment B. After the moment B, the line pressure $P_L$ gradually increases as a function of the time measured by the timer (TM) as shown by solid line C. At a moment D, the gear shifting ends. The gradual increase of the line pressure $P_L$ continues after the moment D until an elapse of a predetermined period of time ($t_0$). In FIG. 8, the time $t_0$ is indicated by a distance between D and E. At the moment E, the line pressure $P_L$ is allowed to reassume its previous level before the gear shifting as shown in FIG. 8.

Figure 5:
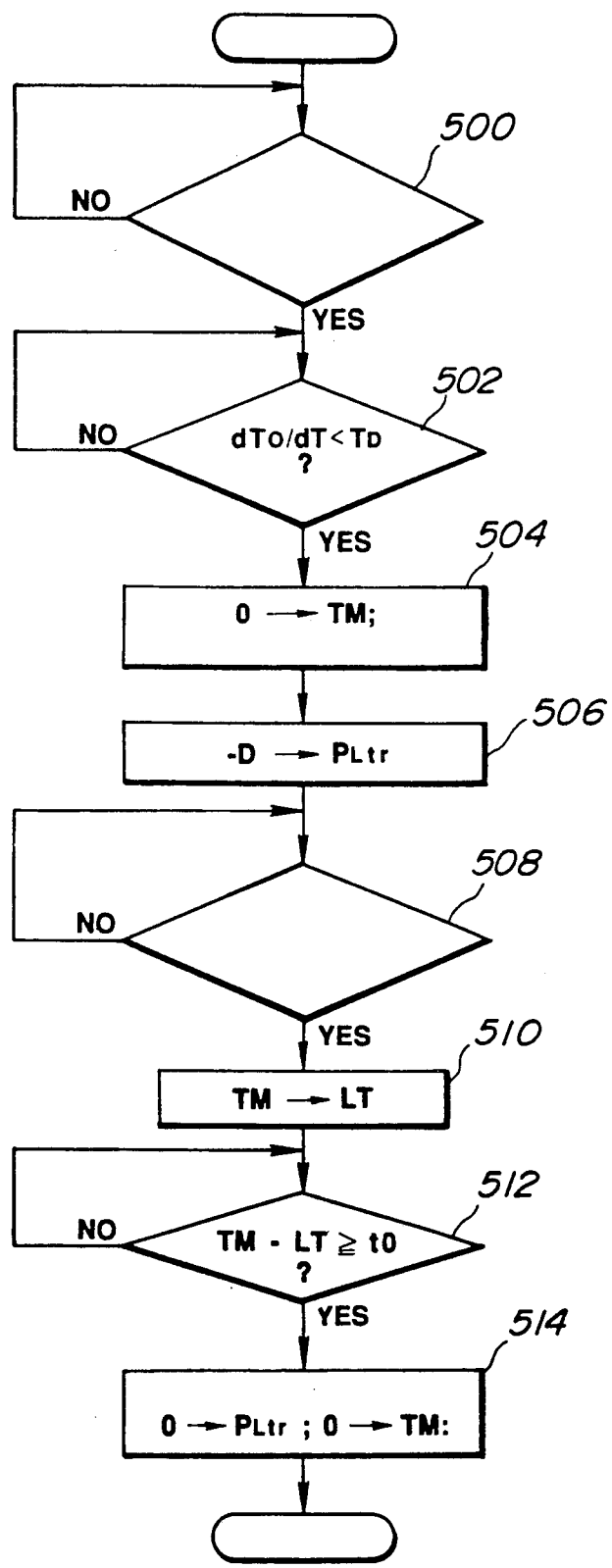
FIGS. 5, 6 and 7 are flow diagrams for explaining the suquence of necessary operating steps.
Figure 6:
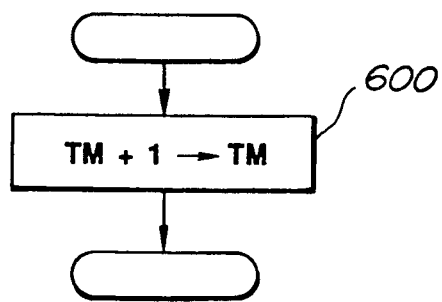
Figure 7:
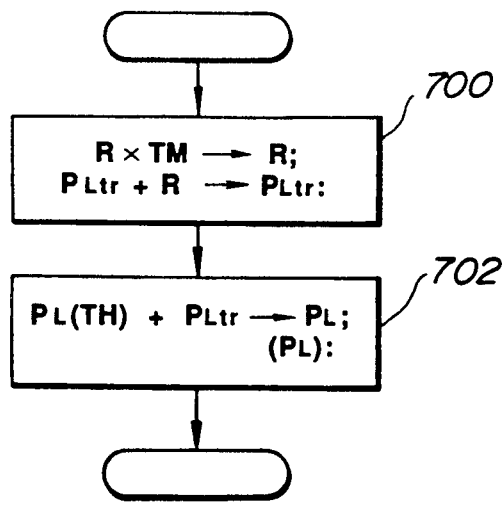

The flow diagrams shown in FIGS. 5, 6 and 7 show an example of a routine for the gear shifting control explained with reference to FIG. 8.

In FIG. 5, there is interrogation 500 whether a gear shifting command signal, in this case a 2-3 upshift signal A, is present. If this is the case, there is another interrogation 502 whether a time derivative of output torque $dT_O/dt$ is less than a predetermined value $T_D$ or not. If this is the case, there is produced in the control unit 300 an initiation command 504 to reset a timer TM and initiate a timer routine shown in FIG. 6, and an initial drop $-D$ is set as a transient line pressure correction value $P_{Ltr}$ used in a line pressure control routine shown in FIG. 7. After being initiated, the timer TM is increased (see step 600 in FIG. 6) by one increment at a regular interval. Thus, the content of the timer TM represents a length of time elapsed from the moment B (see FIG. 8). The routine shown in FIG. 7 is executed at a regular interval. At a step 700, a ramp value R is multiplied by the content of the timer TM, and the line pressure correction value $P_{Ltr}$ is increased by the increment R. At the subsequent step 702, the line pressure P(TH) which is a function of the throttle opening degree TH is corrected by the line pressure correction value $P_{Ltr}$, and the result is converted into a duty which is supplied, as an output, to the line pressure solenoid 44 (see FIG. 3). It is now understood that at the moment, the line pressure $P_L$ drops by the amount represented by $-D$ in step 506 and thereafter increases at a rate determined by the ramp R (see step 700). Returning to FIG. 5, there is an interrogation 508 whether the end of gear shifting is recognized or not. This recognition is made when an actual gear ratio, namely a ratio of an input shaft revolution speed ($N_T$) to an output shaft revolution speed ($N_O$), reaches a predetermined gear ratio for the new gear. If the interrogation 508 results in affirmative, the present count of the timer TM is set as LT (step 510). There is a last interrogation 512 whether a difference TM—lt becomes equal to or greater than a predetermined period of time t0. If this is the case, the initiation command in the control unit 300 disappears and the execution of the timer routine shown in FIG. 6 is terminated and the content of the timer TM is reset, and the line pressure correction value $P_{Ltr}$ is reset (step 514). Thus, at the moment E, since the line pressure correction value $P_{Ltr}$ continues to be zero thereafter, the line pressure is allowed to increase to the level determined by $P_L$(TH).

In the above example, the transient line pressure control ends upon elapse of the predetermined time period (t0) after the end of gear shifting. Alternatively, this timing may be recognized when the time derivative of the output torque $T_O$ fails to become less than a predetermined value.

From the preceding description, it is now appreciated that the progress in the hydraulically actuable coupling to be engaged in the new gear is monitored by tracing the manner of variation in the output shaft torque, and the pressurized hydraulic fluid supplied to this coupling is modified as a function of a length of time elapsed from a moment when a time derivative of the output torque meets a predetermined relationship with a predetermined value ($T_D$).

What is claimed is:

1. A method of controlling an automatic transmission of a motor vehicle, wherein the automatic transmission has an output member, and effects a gear shifting by a hydraulically actuatable coupling by a pressurized hydraulic fluid, the method comprising the steps of:

detecting a torque of the output member and generating an output torque indicative signal indicative of said torque detected;

measuring a length of time elapsed after a rate of change of said output torque indicative signal has met a predetermined relationship with a predetermined value after generation of a gear shifting command signal and generating a time indicative signal indicative of said length of time elapsed; .

modifying the pressurized hydraulic fluid as a predetermined function of said time indicative signal; and actuating the hydraulically actuable coupling by said modified pressurized hydraulic fluid.

2. A method as claimed in claim 1, wherein said step of modifying the pressurized hydraulic fluid terminates upon an elapse of a predetermined length of time after an actual gear ratio has become substantially equal to a gear ratio to be established after the gear shifting.

3. A method as claimed in claim 1, wherein said step of modifying the pressurized hydraulic fluid terminates when said rate of change of said output torque indicative signal meets a predetermined relationship with a second predetermined value after a gear ratio has become substantially equal to a gear ratio to be established after the gear shifting.

4. A method as claimed in claim 1, wherein said step of measuring said length of time includes a step of determining said rate of change of said output torque indicative signal and a step of comparing said determined rate of change with said predetermined value.

5. A method as claimed in claim 1, wherein said step of modifying the pressurized hydraulic fluid includes a step of generating a correction signal as a function of said time indicative signal.

6. A system for controlling an automatic transmission of a motor vehicle, wherein the automatic transmission has an output member, and effects a gear shifting by a hydraulically actuatable coupling by a pressurized hydraulic fluid, the system comprising:
- a torque sensor means for detecting a torque of the output member and generating an output torque indicative signal indicative of said torque detected; and
- a control unit including,
  - means for measuring a length of time elapsed after a rate of change of said output torque indicative signal has met a predetermined relationship with a predetermined value after generation of a gear shifting command signal and generating a time indicative signal indicative of said length of time elapsed, and
  - means for generating a correction signal as a predetermined function of said time indicative signal;
  - means for modifying the pressurized hydraulic fluid in response to said correction signal; and
  - means for actuating the hydraulically actuable coupling by said modified pressurized hydraulic fluid.

* * * * *